United States Patent
Azzouz et al.

(10) Patent No.: US 7,441,819 B2
(45) Date of Patent: Oct. 28, 2008

(54) TUBULAR STRUCTURAL JOINT FOR AUTOMOTIVE FRONT END

(75) Inventors: Michael Azzouz, Livonia, MI (US); Musa Azzouz, Northville, MI (US); Tim Mouch, Troy, MI (US); Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/527,228

(22) Filed: Sep. 26, 2006

(65) Prior Publication Data

US 2008/0073926 A1 Mar. 27, 2008

(51) Int. Cl.
*B62D 27/02* (2006.01)

(52) U.S. Cl. .................... 296/29; 296/203.02

(58) Field of Classification Search ............. 296/29, 296/187.03, 187.09, 193.01, 203.01, 203.02, 296/30, 193.06, 204, 205, 209
See application file for complete search history.

(56) References Cited

U.S. PATENT DOCUMENTS

| | | | | |
|---|---|---|---|---|
| 2,319,455 A | * | 5/1943 | Hardman et al. | 52/801.11 |
| 3,806,184 A | * | 4/1974 | Dean | 296/35.1 |
| 4,236,843 A | * | 12/1980 | Chisholm | 403/2 |
| 4,266,792 A | * | 5/1981 | Sanders et al. | 280/848 |
| 5,106,148 A | * | 4/1992 | Ikeda et al. | 296/203.02 |
| 5,267,515 A | * | 12/1993 | Tsuruda et al. | 105/397 |
| 5,454,453 A | | 10/1995 | Meyer | 180/377 |
| 5,549,352 A | * | 8/1996 | Janotik et al. | 296/209 |
| 5,597,198 A | * | 1/1997 | Takanishi et al. | 296/193.09 |
| 5,613,726 A | * | 3/1997 | Hobbs et al. | 296/186.1 |
| 5,681,057 A | * | 10/1997 | Whirley et al. | 280/784 |
| 5,868,457 A | * | 2/1999 | Kitagawa | 296/187.09 |
| 5,971,460 A | * | 10/1999 | Enning | 296/30 |
| 6,092,865 A | * | 7/2000 | Jaekel et al. | 296/205 |
| 6,227,321 B1 | * | 5/2001 | Frascaroli et al. | 180/68.4 |
| 6,293,618 B1 | | 9/2001 | Sukegawa | 296/209 |
| 6,499,798 B2 | | 12/2002 | Takemoto | 296/203.02 |
| 6,533,347 B2 | * | 3/2003 | Sanada | 296/203.02 |

(Continued)

FOREIGN PATENT DOCUMENTS

EP 336781 A2 * 10/1989 ............ 296/205

(Continued)

*Primary Examiner*—D. Glenn Dyoan
*Assistant Examiner*—Paul A Chenevert
(74) *Attorney, Agent, or Firm*—Frederick Owens; Miller Law Group, PLLC

(57) ABSTRACT

A structural joint is formed between the upper frame rail, which bends downwardly to define a generally vertically extending portion, and a generally fore-and-aft extending lower frame rail that can be tuned to manage the flow of crash energy during an impact situation. The upper frame rail is formed as a conventional four-sided tube, but is reformed at the intersection with the lower frame rail into a multiple-sided configuration that defines a mating surface for connection to the lower frame rail. The size of the mating surface has a fore-and-aft width dimension of between 20 and 40 millimeters and can be tuned to selectively control the management of crash forces encountered during an impact. The welded connection between the upper and lower frame rails forming this structural joint provides adequate stiffness and rigidity for the function of an automotive frame, yet presents a reduced shear strength in the fore-and-aft direction.

19 Claims, 2 Drawing Sheets

U.S. PATENT DOCUMENTS

| | | | | |
|---|---|---|---|---|
| 6,616,217 B1 * | 9/2003 | Robinson | .................... | 296/178 |
| 6,814,400 B2 * | 11/2004 | Henderson et al. | ..... | 296/193.09 |
| 7,008,007 B2 * | 3/2006 | Makita et al. | .......... | 296/187.09 |
| 7,066,533 B2 * | 6/2006 | Sohmshetty et al. | ... | 296/203.02 |
| 7,147,275 B2 * | 12/2006 | Matsuyama et al. | .... | 296/203.02 |
| 7,185,724 B2 * | 3/2007 | Dupuis et al. | .............. | 180/68.5 |
| 7,210,733 B2 * | 5/2007 | Mouch et al. | .......... | 296/203.02 |
| 7,219,954 B2 * | 5/2007 | Gomi et al. | ........... | 296/203.02 |
| 7,237,832 B2 * | 7/2007 | Saeki | .................... | 296/193.06 |
| 7,243,986 B2 * | 7/2007 | Dupuis et al. | .............. | 296/205 |
| 7,267,394 B1 * | 9/2007 | Mouch et al. | .......... | 296/203.02 |
| 7,281,757 B2 * | 10/2007 | Dupuis et al. | .............. | 296/205 |
| 7,296,824 B2 * | 11/2007 | Yasui et al. | ................ | 280/784 |
| 7,322,106 B2 * | 1/2008 | Marando et al. | ......... | 29/897.2 |
| 2001/0000119 A1 * | 4/2001 | Jaekel et al. | ................. | 296/29 |
| 2003/0151273 A1 * | 8/2003 | Sakamoto et al. | ...... | 296/187.01 |
| 2004/0046381 A1 | 3/2004 | Yoshida | ..................... | 280/784 |
| 2004/0051345 A1 * | 3/2004 | Gabbianelli et al. | .... | 296/203.01 |
| 2004/0100127 A1 * | 5/2004 | Saitou | ................... | 296/203.02 |
| 2005/0012362 A1 * | 1/2005 | Patberg et al. | ......... | 296/203.01 |
| 2005/0236827 A1 * | 10/2005 | Mouch et al. | ................ | 280/788 |
| 2005/0258667 A1 * | 11/2005 | Grueneklee et al. | ......... | 296/204 |
| 2006/0006699 A1 * | 1/2006 | Matsuyama et al. | .... | 296/203.02 |
| 2006/0043711 A1 * | 3/2006 | Kuze et al. | ................... | 280/735 |
| 2007/0176443 A1 * | 8/2007 | Yasuhara et al. | ............. | 293/133 |
| 2007/0187995 A1 * | 8/2007 | Mouch et al. | ................ | 296/209 |

FOREIGN PATENT DOCUMENTS

| | | | | |
|---|---|---|---|---|
| EP | 840033 A1 | * | 5/1998 | |
| FR | 2704012 A1 | * | 10/1994 | |
| JP | 63215468 A | * | 9/1988 | .................. 296/29 |
| JP | 03213473 A | * | 9/1991 | ............ 296/203.01 |
| JP | 04303075 A | * | 10/1992 | ............ 296/203.01 |

* cited by examiner

TUBULAR STRUCTURAL JOINT FOR AUTOMOTIVE FRONT END

FIELD OF THE INVENTION

This invention relates generally to the frame structure of an automotive vehicle and, more particularly, to a frame configuration for the connection of a two crossing beam members forming a part of the front end structure of an automobile.

BACKGROUND OF THE INVENTION

The front end structure of an automotive vehicle is designed to provide visual appeal to the vehicle owner while functioning as an energy absorbing structure during frontal and offset crashes. The size, shape and construction of the front end structure contribute to the ability of the front end structure to attenuate the crash pulse and restrict intrusions into the operator's cabin of the vehicle. It is important to design a front end structure to absorb crash energy through the frame components. To that extent, a significant amount of effort by vehicle engineers is devoted to designing the vehicle frame to crush in a controlled manner while absorbing a maximum amount of energy.

One of the goals in the design of vehicle frame structure is to provide better engagement and absorption of energy during a collision. The major components in absorbing energy in frontal as well as rear impacts are the rails. Furthermore, in a side collision if the vehicle has a softer front end it can help mitigate the injuries to occupants in both vehicles. If there is an apparatus to absorb more energy and prolong the time to crush the rails, the crash pulse and intrusion can be reduced significantly.

Vehicle frames typically include an upper rail and a generally vertically spaced lower rail. Preferably, the upper rail joins the lower rail, such as at the forwardmost portion of the vehicle frame, to define an integrally connected automotive frame structure. The structural joint connection between the vehicular upper and lower structural member is conventionally designed as a solid connection which provided good structural integrity in all directions. One approach to the management of crash energy is to reduce the structural efficiency of the joint between the upper and lower rail members in the fore-and-aft direction to allow a "break away" while experiencing a safety load condition. By properly designing the structural joint between the upper and lower rails, the amount of crash energy that would be taken by the lower load path relative to the upper load path can be properly tuned, as well as tune the relative timing in which each load path reaches the passenger compartment. While the formation of the upper and lower rail members is preferably accomplished through hydroforming techniques which forms the upper and lower rails as tubular members, the upper and lower rails can be formed of any material or any construction technique, including stamped and roll formed vehicular body structures.

In U.S. Pat. No. 5,454,453, issued to James Meyer on Oct. 3, 1995, and assigned to Ford Motor Company, the concept of a break-away bracket is used to connect a cross member with the frame rails so that the bracket will deform upon impact and prevent damage to the cross member. U.S. Pat. No. 6,293,618, granted to Akihiro Sukegawa on Sep. 25, 2001, discloses a welding of a center pillar beam and a side sill to form a joint by welding the lower edges of the center pillar with the corresponding mating part of the side sill to provide sufficient strength in this joint to resist intrusion during side impact without using a T-shaped member. Although the Sukegawa patent discloses that the welding distance between the center pillar and the side sill can be changed to provide varying amounts of strength, there does not appear to be any teaching for the welding of this joint to permit breakaway upon impact.

In U.S. Pat. No. 6,499,798, granted to Yorito Takemoto on Dec. 31, 2002, a vehicle body structure is disclosed in which the front side member and kick up portion are welded to each other in a manner so as to be capable of deforming upon impact. Published U.S. Patent Application No. 2004/0046381, published on Mar. 11, 2004, discloses a subframe mounted to a vehicle body through subframe mounts. Certain of the subframe mounts are formed with a fracture stress lower than the fracture stress of the other subframe mounts to enable the subframe to break away from the vehicle body and prevent intrusion of the subframe into the passenger compartment.

Accordingly, it would be desirable to provide a structural joint between two primary frame components in an automotive vehicle to permit the joint to break apart in a fore-and-aft direction in order to tune the amount of crash energy that would be taken by the lower load path relative to the upper load path, as well as the relative timing in which each load path reaches the passenger compartment during an impact situation.

SUMMARY OF THE INVENTION

It is an object of this invention to overcome the aforementioned disadvantages of the known prior art by providing a structural joint between the upper and lower frame rails in an automotive frame that can tune the amount of crash energy that would be taken by the lower load path relative to the upper load.

It is another object of this invention to provide a structural joint between the upper and lower frame rails that can tune the relative timing in which the upper and lower load paths reach the passenger compartment.

It is yet another object of this invention to provide a structural joint between two primary frame members in an automotive vehicle to provide a "break away" in a fore-and-aft direction between the two primary frame members while experiencing a safety load condition.

It is a feature of this invention that the shape of the upper rail member is modified to transform from a conventional four sided cross-sectional configuration into a multiple-sided cross-sectional configuration that presents a predetermined sized surface against the mating lower frame rail to provide a tunable welding surface therebetween.

It is an advantage of this invention that the formation of the structural joint can be accomplished with structural members formed through different manufacturing processes.

It is another advantage of this invention that the formation of the structural joint is compatible with modular manufacturing processes.

It is another feature of this invention that the upper frame rail is formed into a multiple-sided configuration that presents a mating surface for connection to the lower frame rail member that has a fore-and-aft width dimension of between 20 and 40 millimeters.

It is still another advantage of this invention that the mating surface of the upper rail member configuration provides sufficient structural integrity to support the automobile while reducing shear strength sufficiently to permit a breakaway of the upper and lower rails during the imposition of crash loads.

It is yet another advantage of this invention that the cross sectional area of the mating surface of the upper frame rail and the horizontal to vertical line lengths of the welds can be used to tune the required safety performance of the structural joint.

It is still another advantage of this invention that conventional welding techniques can be utilized to connect the mating surface of the upper frame rail to the lower frame rail.

It is yet another advantage of this invention that the crash performance of the front horn section of the lower frame rail is unaffected by the formation of the structural joint using the principles of the instant invention.

It is still another feature of this invention that the size of the mating surface of the lower frame rail to be joined to the lower frame rail can be selected to tune the amount of crash energy that would follow the upper frame rail load path relative to the lower frame rail load path.

It is a further object of this invention to provide a structural joint between two primary frame members of an automotive vehicle to tune the management of crash energy through the frame components, which is durable in construction, inexpensive of manufacture, carefree of maintenance, facile in assemblage, and simple and effective in use.

These and other objects, features and advantages are accomplished according to the instant invention by providing a structural joint between the upper frame rail, which bends downwardly to define a generally vertically extending portion, and a generally fore-and-aft extending lower frame rail that can be tuned to manage the flow of crash energy during an impact situation. The upper frame rail is formed as a conventional four-sided tube, but is reformed at the intersection with the lower frame rail into a multiple-sided configuration that defines a mating surface for connection to the lower frame rail. The size of the mating surface has a fore-and-aft width dimension of between 20 and 40 millimeters and can be tuned to selectively control the management of crash forces encountered during an impact. The welded connection between the upper and lower frame rails forming this structural joint provides adequate stiffness and rigidity for the function of an automotive frame, yet presents a reduced shear strength in the fore-and-aft direction.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
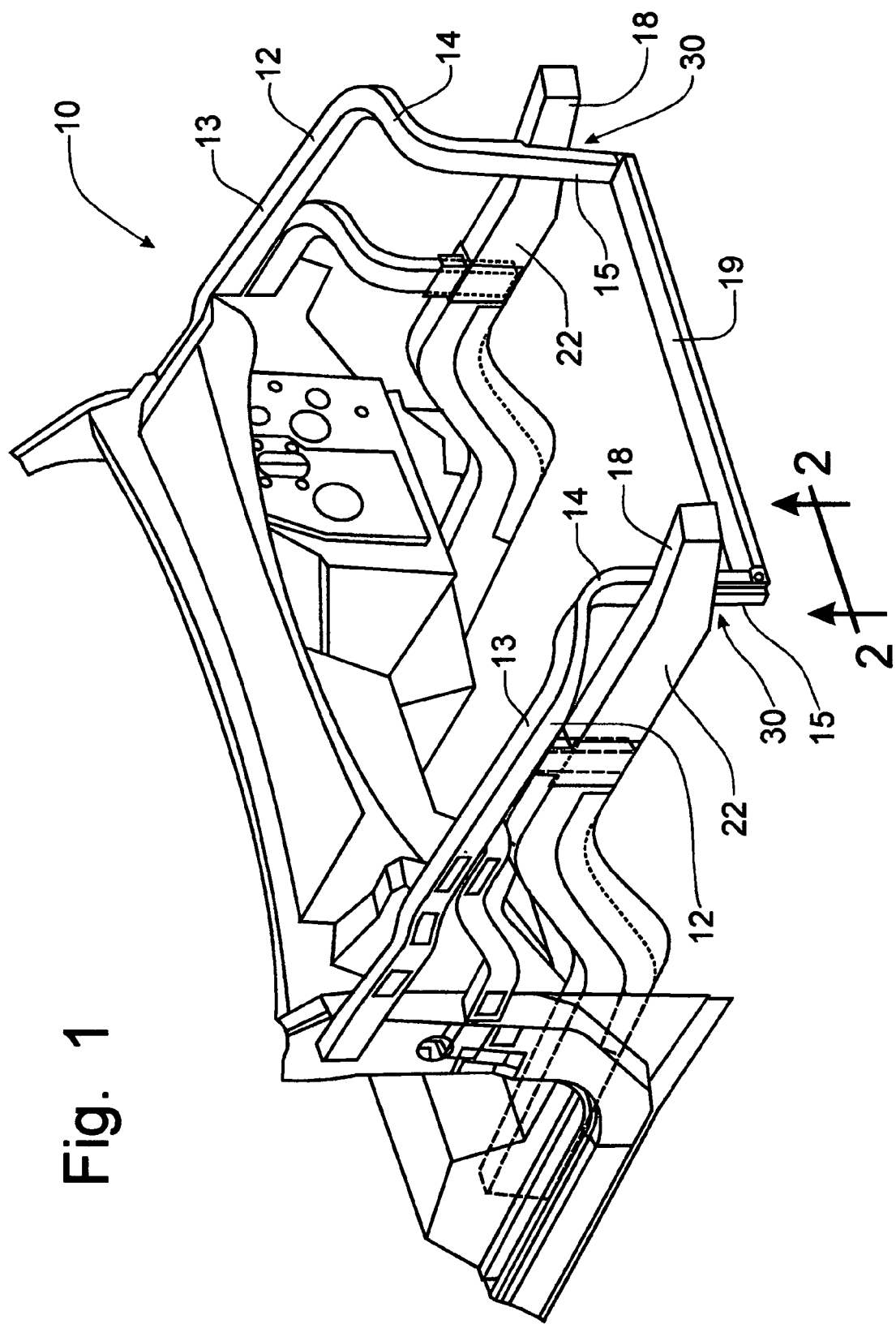
FIG. 1 is a perspective view of the front portion of an automotive frame incorporating the principles of the instant invention.

Referring to FIGS. 1-4, a structural joint between two primary components of an automotive frame incorporating the principles of the instant invention can best be seen. The two primary members of the automotive frame 10 are the upper frame rail 12 and the lower frame rail 22. The upper frame rail 12 includes a generally horizontally extending portion 13 that is located at the upper outside portion of the automobile on both respective sides thereof. The upper frame rail 12 then preferably bends through a bend portion 14 inwardly and downwardly to form a generally vertically extending portion 15 that passes inboard of the lower frame rail 22. A radiator support member 19 is connected to the laterally opposing, vertically extending portions 15 of the upper frame rail to extend transversely across the front of the automotive frame 10. The lower frame rail 22 extends forwardly of the vertically extending portion 15 of the upper frame rail 12 to form the horn section 18 to which the bumper (not shown) is traditionally mounted.

The horn section 18 of the lower frame rail 22 is typically formed with "triggers" (not shown) to direct the collapse thereof during the loading of impact crash forces thereon. Thus, the horn sections 18 of the automotive frame 10 provide the first management of crash forces during an impact situation. After collapsing the horn sections 18, the impact forces encounter the structural joint 30 between the upper frame rail 12 and the lower frame rail 22. Conventional welding of the upper and lower frame rails 12, 22 would resist the impact crash forces and allow the crash energy to be directed rearwardly along both the upper and lower frame rail 12, 22 paths toward the passenger compartment of the vehicle.

Figure 3:
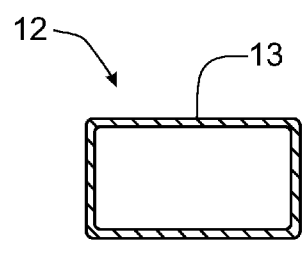
FIG. 3 is a cross-sectional view of the horizontally extending portion of the upper frame rail corresponding to lines 3-3 of FIG. 2.
Figure 4:
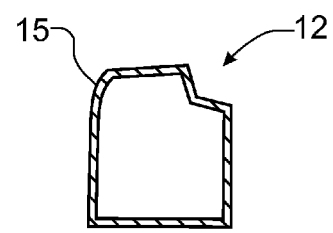
FIG. 4 is a cross-sectional view of the vertically extending portion of the upper frame rail at the structural joint formed with the lower frame rail.

The upper frame rail 12 is typically formed as a four-sided, generally rectangular tubular member, as is represented in FIG. 3, that can be shaped into the bent and twisted configuration represented in FIG. 1 through a hydroform manufacturing process. The upper frame rail can also be formed through other manufacturing techniques to provide the frame structure depicted in FIG. 1. According to the principles of the instant invention, the cross-sectional configuration of the upper frame rail can remain the conventional four-sided, rectangular shape through the horizontally extending portion 13, and even through the bend portion 14. The cross-sectional configuration through the vertically extending portion 15 that mates with the lower frame rail 22 is formed into a multiple-sided configuration that includes a mating surface 32 that is positionable against the lower frame rail 22 for welding thereto. The remainder of the cross-sectional configuration can be sized and shaped to provide the structural rigidity and stiffness needed at the joint 30, and can be formed as a four-sided, or a more than four sided, configuration. For example, the preferred embodiment of the cross-sectional configuration of the vertically extending portion 15 of the upper rail through the structural joint 30 is depicted in FIG. 4 and consists of a six-sided shape.

Figure 2:
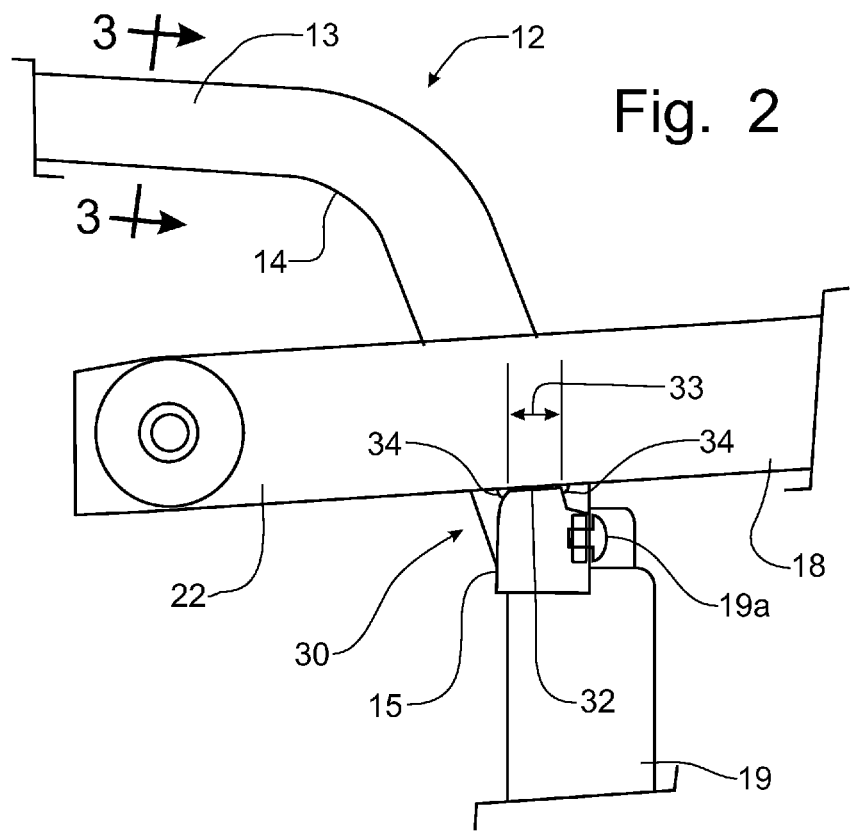
FIG. 2 is an enlarged bottom plan view, corresponding to lines 2-2 in FIG. 1, of the structural joint between the vertically extending portion of the upper frame rail and the longitudinally extending lower frame rail incorporating the principles of the instant invention.

The mating surface 32 should have a fore-and-aft extending width dimension of between approximately 20 and 40 millimeters, with approximately a 25 millimeter width dimension being the preferred embodiment. This width dimension is indicated in FIG. 2 by the reference number 33. The vertical length of the weld lines 34, which can be formed through a conventional MIG welding process, can also be selectively varied to provide the desired shear strength of the structural joint 30. By selecting the predetermined shear strength of the structural joint 30, the transfer of crash energy through the structural joint 30 into the flow paths to the passenger compartment represented by the respective upper and lower frame rails 12, 22, can be managed. Furthermore, the timing of the arrival of the crash energy to the passenger compartment can be tuned by varying the shear strength of the structural joint 30 formed according to the principles of the instant invention.

The shape of the vertically extending portion 15 of the upper frame rail 12 can be designed to allow for the connection of the radiator support member 19, such as through the fastener 19a depicted in FIG. 2. The efficiency of the crash energy management of the horn sections 18 of the lower frame rails 22 is not affected by the formation of the structural joint 30, as the triggers can still be incorporated into the horn section 18 to control the collapsing thereof during impact situations.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A structural joint in an automotive frame, comprising:
    a first frame tubular member having a vertically extending portion;
    a second frame member having a longitudinally extending portion located adjacent to the vertically extending portion of the first frame member;
    the first frame member being configured into a multiple sided cross-sectional shape that defines a mating surface for welding to the second frame member and multiple non-mating surfaces, the mating surface having a longitudinally extending width dimension of between 20 and 40 millimeters, at least two of the non-mating surfaces having a width dimension corresponding to the longitudinally extending width dimension that is larger than the longitudinally extending width dimension of the mating surface to provide a breakaway connection in a longitudinal direction between said first and second frame member so that said structural joint is tuned to direct crash forces in a predetermined manner.

2. The structural joint of claim 1 wherein the first frame member is a tubular upper frame rail having a horizontally extending portion and a bend portion transitioning the horizontally extending portion into the vertically extending portion, the horizontally extending portion having a cross-sectional configuration that is different than a corresponding cross-sectional configuration of the vertically extending portion.

3. The structural joint of claim 2 wherein the horizontally extending portion of the upper frame rail has a four-sided cross-sectional shape, the vertically extending portion of the upper frame rail being formed into a cross-sectional shape having at least five sides, one of which being the mating surface.

4. The structural joint of claim 3 wherein the longitudinally extending width dimension of the mating surface is approximately 25 millimeters.

5. The structural joint of claim 4 wherein a radiator support member is connected to the vertically extending portion of the upper frame rail.

6. The structural joint of claim 5 wherein the lower frame rail includes a horn section projecting forwardly of the vertical portion of the upper frame rail.

7. The structural joint of claim 3 wherein the mating surface is welded to the lower frame rail member along vertically extending weld lines, each weld line having a length selected in conjunction with the longitudinally extending width dimension of the mating surface to provide a preselected shear strength to allow the upper frame rail to break away from the lower frame rail during imposition of crash energy loading.

8. In an automotive frame having a tubular upper frame rail including a horizontally extending portion, a vertically extending portion and a bend portion interconnecting the horizontally and vertically extending portions; a longitudinally extending lower frame rail spaced vertically below the upper frame rail, the vertically extending portion of the upper frame rail being located adjacent to the lower frame rail, an improved structural joint between the vertically extending upper frame rail and the lower frame rail comprising:
    the horizontally extending portion being formed into a first cross-sectional configuration, the vertically extending portion of the upper frame rail being formed into a second cross-sectional configuration different from the first cross-sectional configuration that defines a mating surface for engagement with the lower frame rail, the mating surface having a longitudinally extending width dimension in the range of 20 to 40 millimeters, the mating surface being welded to the lower frame rail by longitudinally spaced, vertically extending weld lines having a predetermined length to provide a breakaway connection in a longitudinal direction between said first and second frame member so that said structural joint is tuned to direct crash forces in a predetermined manner.

9. The automotive frame of claim 8 wherein the length of each vertically extending weld line is selected in conjunction with the width dimension of the mating surface to provide a preselected shear strength to allow the upper frame rail to break away from the lower frame rail during imposition of crash energy loading.

10. The automotive frame of claim 9 wherein the horizontally extending portion of the upper frame rail has a four-sided cross-sectional shape, the cross-sectional configuration of the vertically extending portion of the upper frame rail having at least four sides, one of which being the mating surface.

11. The automotive frame of claim 10 wherein the cross-sectional configuration of the vertically extending portion of the upper frame rail has at least five sides, including the mating surface.

12. The automotive frame of claim 10 wherein the longitudinally extending width dimension of the mating surface is approximately 25 millimeters.

13. The automotive frame of claim 12 wherein a radiator support member is connected to the vertically extending portion of the upper frame rail, the lower frame rail including a horn section projecting forwardly of the vertical portion of the upper frame rail.

14. The automotive frame of claim 13 wherein the upper frame rail is manufactured through a hydroform manufacturing process that re-shapes the upper frame rail from a four-sided cross-sectional shape at the horizontally extending portion into the cross-sectional configuration defining the mating surface at the vertically extending portion.

15. A method of forming a structural joint between a tubular upper frame rail member having a horizontally extending portion and a vertically extending portion and a longitudinally extending lower frame rail member positioned adjacent the vertically extending portion of the upper frame rail member to provide a breakaway connection in a longitudinal direction between said first and second frame member so that said structural joint is tuned to direct crash forces in a predetermined manner, comprising the steps of:
    configuring the horizontally extending portion into a first cross-sectional configuration;

forming the vertical extending portion of the upper frame rail member adjacent the lower frame rail into a second cross-sectional configuration different from the first cross-sectional configuration and defining a mating surface having a longitudinally extending width dimension of between approximately 20 and 40 millimeters; and welding the mating surface to the lower frame rail member with vertically extending, longitudinally spaced weld lines, each of the weld lines having a vertical length.

16. The method of claim 15 wherein the forming step creates the cross-sectional configuration of the vertically extending portion into a shape having at least five sides.

17. The method of claim 15 wherein the welding step creates a shear strength for the structural joint that allows the upper frame rail member to break away from the lower frame rail member during the imposition of crash energy loading.

18. The method of claim 17 wherein the upper frame rail member has a horizontally extending portion and a bend portion interconnecting the horizontally extending portion and the vertically extending portion, the forming step being operable to reshape the upper frame rail member from a rectangular cross-sectional configuration at the horizontally extending portion to the cross-sectional configuration defining the mating surface.

19. The method of claim 18 wherein the forming step forms the mating surface with the longitudinally extending width dimension of approximately 25 millimeters.

* * * * *